United States Patent Office 3,542,903
Patented Nov. 24, 1970

3,542,903
COMPOSITE POLYETHER-POLYESTER
ELASTIC FIBERS
Nicholas R. Congiundi and Lloyd T. Jenkins, Cary, N.C.,
assignors to Monsanto Company, St. Louis, Mo., a corporation of Delaware
No Drawing. Filed May 26, 1966, Ser. No. 553,038
Int. Cl. C08g 41/04, 22/00
U.S. Cl. 260—858
12 Claims

ABSTRACT OF THE DISCLOSURE

Composite elastic fibers are prepared from segmented polyurethane-urea polymers composed of a mixture of a polyurethane-urea polymer produced from a polyether substrate and a polyurethane-urea produced from a polyester substrate. The polymer mixture when spun into fibers gives improved elongation and tenacity.

---

This invention relates to elastic fibers. More particularly, this invention relates to synthetic elastic fibers made from segmented polymers and to a process for producing them.

Elastic fibers composed of segmented polyurethane polymers have found significant success in the textile field. While such fibers heretofore known have been commercially acceptable, there is a constant striving for ways in which their physical properties may be improved. Prior to this time, these fibers have been spun from elastomers which are produced by reacting a polyether glycol substrate or a polyester glycol substrate with an aromatic diisocyanate to produce an isocyanate-terminated prepolymer which is thereafter chain-extended with a diamine to give a segmented, polyurethane-urea elastomer. Although suggestions have been made that the elastomer may be derived from a mixture of a polyether glycol and a polyester glycol, there has never been any indication given of how improved elastic properties could be obtained in an elastomer derived from such a mixture.

It is an object of this invention to provide a synthetic elastic filament having improved elastic properties.

It is a further object of this invention to provide an elastic filament derived from a polyester glycol and a polyether glycol.

It is a further object of this invention to provide a process for preparing an elastic fiber from a polyester glycol and a polyether glycol.

Other objects will become apparent from the following description.

Briefly, these objects are accomplished by providing a synthetic, composite, elastic fiber having an essentially linear structure and composed of (I) 35 to 80 weight percent of a segmented polymer having the formula

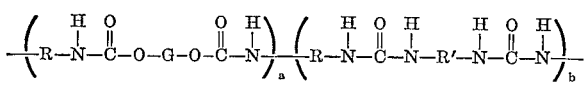

wherein G is a long chain polyester radical having a structure such that the polyester diol of the formula HO—G—OH has a melting point below about 60° C. and a molecular weight above about 400, R is an aromatic radical containing from 6 to 20 carbon atoms,

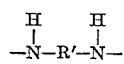

is a diamino radical having a structure such that a diamine of the formula $H_2N-R'-NH_2$ is a member of the group consisting of hydrazine, alkylene diamines, alkarylene diamines, and dihydrazides and a and b are integers greater than 0; and (II), 65 to 20 weight percent of a segmented polymer having the formula

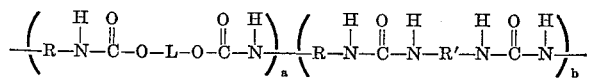

wherein R, R', a and b are as defined above and L is a long chain polyether radical having a structure such that the polyether diol of the formula HO—L—OH has a melting point below about 60° C. and a molecular weight above about 400.

The composite elastic fibers of this invention are prepared by a series of steps. First, a polyester diol having a melting point below about 60° C. and a molecular weight above about 400 is reacted with an aromatic diisocyanate in a molar ratio of diisocyanate to polyester diol between 1.2:1 and 2.5:1. This reaction forms an isocyanate-terminated prepolymer which is then reacted with a diamine in a molar ratio of about 1:1 to form a first polyurethane-urea polymer. A second polymer is formed separately by reacting a polyether diol having a melting point below about 60° C. and a molecular weight above about 400 with an aromatic diisocyanate in a molar ratio of diisocyanate to polyether diol between 1.2:1 and 2.5:1 to form a second isocyanate-terminated prepolymer which is thereafter reacted with a diamine in a molar ratio of about 1:1 to form a second polyurethane-urea polymer. The two polyurethane-urea polymers, one produced from a polyether substrate and one produced from a polyester substrate are thereafter admixed in a weight ratio of 35 to 80 percent of the polyester-urethane-urea polymer and 65 to 20 weight percent of the polyether-urethane-urea polymer. This polymer mixture is then spun into fibers in the normal manner.

The composite fibers of the present invention have been found to possess surprising improvements in their elastic properties of elongation and tenacity. This improvement is unexpected inasmuch as the composite fibers possess elasticity and tenacity which is greater than fibers produced from either the polyester substrate alone or the polyether substrate alone. The improvement in these elastic properties is not done at the expense of other properties, such as tensile properties. The tensile properties of the composite fibers of the present invention are quite satisfactory even though the elastic properties have been significantly increased.

As stated above, the composite, synthetic elastic fibers of this invention have an essentially linear structure. 35 to 80 weight percent of the composite fiber is composed of a segmented, linear polymer having the formula

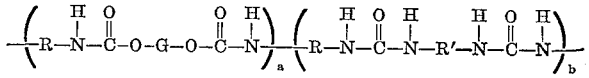

wherein G, R, R', a and b are as defined above. That portion of this segmented polyester-urethane-urea polymer having the structure represented by the formula

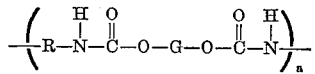

represents a repeating unit of a linear polyester-urethane polymer which comprises 60 to 95 weight percent of the segmented polyester-urethane-urea polymer. The remainder of the segmented polymer is provided by the structure

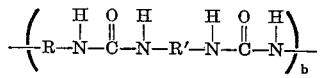

which represents a repeating unit of a linear urea polymer having a melting point above 200° C. when a molecular weight above 10,000. The other component of the synthetic, composite elastic fiber, that is, 60 to 20 weight percent, is composed of a segmented polyether-urethane-urea polymer having the formula

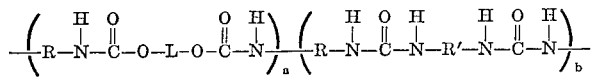

wherein L, R, R', $a$ and $b$ are as defined above. The structure

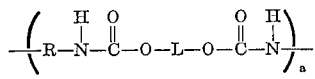

represents a repeating unit of a polyether-urethane polymer which provides 60 to 95 weight percent of such segmented polyether-urethane-urea polymer, with the remainder of such segmented polymer being provided by the structure

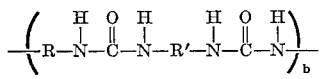

which, as above, represents a repeating unit of a linear, urea polymer having a melting point above 200° C. when of a molecular weight above 10,000.

As stated above, the polyester diol which is employed to form the polyester-urethane-urea portion of the synthetic, composite fibers of this invention are those which are liquid at temperatures below about 60° C. and have a molecular weight above about 400. Among the polyester diols which may be mentioned are those prepared by reacting acids, esters, or acid halides with a molar excess of a glycol. Suitable glycols are the polymethylene glycols, e.g., ethylene, propylene, butylene, decamethylene, substituted polymethylene glycols and cycloaliphatic glycols such as cyclohexane diol. These glycols may be reacted with the proper molar ratio of aliphatic, cycloaliphatic or aromatic acids or their ester-forming derivatives to produce polymers terminated essentially with hydroxyl groups although the presence of a few carbonyl groups is not detrimental. Suitable acids for preparing the polyester glycols and/or copolyester glycols are succinic, adipic, suberic, sebacic, isophthalic, terephthalic and other like acids. The alkyl- and halogen-substituted derivatives of these acids may also be used. Other type polyesters, such as polycarbonate and polyesteramides may also be used. Besides the classical polyesters, that is, those formed by reaction of a glycol with an acid, it is also within the purvue of this invention, and indeed sometimes even preferred, to employ a polyester produced by the opening of a lactone ring, for example, caprolactone by reaction with a glycol. Thus, the polyester diols employed to produce the fibers of this invention may be polycaprolactone, polymethylcaprolactone and the like and copolymers of these polyesters as well as copolymers of these polyesters with other previously mentioned polyesters.

The polyether diols employed to form the polyether-urethane-urea segment of the composite elastic fibers of this invention may be homopolymers or copolymers. The essential features are that they be difunctional and have a melting point below about 60° C. and a molecular weight above 400. The polyethers are primarily poly(alkleneoxide) glycols, such as poly(ethyleneoxide) glycol, and poly(tetramethyleneoxide) glycol. Some of the oxygens may be replaced with sulfur atoms and/or some of the alkylene groups may be replaced with arylene or cycloaliphatic radicals. Even where the linkages and types of organic radicals are the same, the compositions may still be copolymers, such as copolyethers derived from more than one glycol.

The polyester diols and polyether diols from which the segmented polymers used to produce the composite elastic fibers of this invention are derived may contain a single type of linkage such as in conventional polyesters and polyethers or they may have more than one type of linkage, as the polyesters or polyethers chain-extended with diisocyanate or acid dianhydride. In such a case, for example, when chain-extended with diisocyanates, an occasional urethane linkage occurs in the polymer chain. The polyester and polyether diols may be substituted with halogen, alkyl or other similar groups which do not interfere with the subsequent polymerization under the conditions employed.

The polyether and the polyester diols are, as pointed out above, separately reacted with an aromatic diisocyanate, such as p,p'-diphenylmethane diisocyanate or toluene diisocyanate. In accordance with this invention the diisocyanate is employed in a molar ratio between 1.2:1 and 2.5:1, preferably 1.4:1 and 2.0:1. These reactions are frequently affected by mixing the diol and the aromatic diisocyanate under anhydrous conditions either at room temperatures or at moderately elevated temperatures, for example, 70 to 150° C., to form a liquid isocyanate-terminated prepolymer which is an essentially linear polyurethane having terminal isocyanate groups.

Representative of the aromatic diisocyanates that may be mentioned are such materials as m- and p-phenylene diisocyanate, tolylene diisocyanate, p,p'-diphenyl diisocyanate and 1,5-naphthalene diisocyanate, and in this category we include the aromatic aliphatic diisocyanate such as p,p'-diphenylmethane diisocyanate. Many other aromatic diisocyanates suitable for reaction with the diol to yield polyurethane prepolymers capable of being extended to the elastomeric state are disclosed in the prior art and it is our desire to emphasize that the invention embraces the use of any and all such aromatic diisocyanates, insofar as they function to yield segmented polymers from which fibers having the requisite physical properties may be prepared.

The separate prepolymers formed by the reaction indicated above are separately chain-extended with a diamine such as hydrazine, alkylene diamines, e.g., ethylene diamine, propane diamine and cyclohexane diamine, alkylarylene diamines, e.g., 1,3-benzene bis(methylamine), or dihydrazidies such as carbodihydrazide and acetic acid dihydrazide. Chain-extending diamine agents are well known to the art and it is thought unnecesssary to repeat all operable diamine chain-extending agents here. Suffice it to say that any diamine chain-extending agent previously known as operable in the process to produce the segmented polymers employed in the production of the composite fibers of the present invention provided they do not adversely affect the properties of the fibers.

It is generally more convenient to carry out the reactions, both the formation of the prepolymers and the chain-extension reaction, in a solution. Any solvent may be employed which is a solvent for and nonreactive with, under the reaction conditions employed, the diols and diisocyanate, the prepolymer products and the chain-extending agent. Illustrative of suitable solvents are dimethylformamide, dimethylacetamide, dimethylpropionamide, dimethylsulfoxide and the like. The temperature of the prepolymerization reaction is not critical to the extent that temperatures as high as 100° C. may be employed. However, when operating under the high temperature there is a greater tendency toward the formation of gel which acts detrimentally on the final fiber properties. It is generally preferred to operate at a temperature between 25° C. and 50° C. These same temperatures are ordinarily employed during the chain-extension reaction. Generally, the chain-extending diamine is added to the prepolymer in a stoichiometric amount, that is, about one mole of diamine for each mole of prepolymer. However, to prevent cross-linking, it is sometimes necessary to employ enough diamine to react with all the isocyanate groups, i.e., at least the chemical equivalent of diamine group to isocyanate groups. It will be understood that the 1:1 molar ratio referred to above will therefore include such slight variations as are required to provide the chemical equivalent of diamine group to isocyanate groups.

The separately formed polymers, that is, the polyester-urethane-urea polymer and the polyether-urethane-urea polymer, are then admixed as described above and spun into fibers. The fibers of this invention are prepared from the polymer by dry or wet spinning. Conventional conditions are used for dry spinning except that the elastic filaments usually have to be talced or lubricated because they tend to be somewhat tacky immediately after extrusion. When wet spinning, the spinning speeds are usually lower than the dry spinning speeds, but this procedure has definite advantages when larger denier filaments are being prepared. In wet spinning, solutions of the polymer, for example, in dimethylformamide or dimethylacetamide, are usually extruded into hot water baths.

In order to more fully describe this invention, the following example is given by way of illustration. It is to be understood, however, that it is only illustrative and is not to be considered limiting in any manner.

EXAMPLE

A polyester-urethane-urea polymer was prepared in the following manner. A solution of 400 grams of polycaprolactone diol, internally extended with toluene diisocyanate and having a molecular weight of 2750, in 183 grams of dimethylacetamide was admixed with a solution of 71 grams of p,p₂-methylene diphenyl diisocyanate in 71 grams of dimethylacetamide. Reaction was allowed to occur for one hour without temperature control. The maximum temperature was 53.5° C. after twenty minutes and fell gradually to 30° C. at the end of the reaction period. 784 grams of the prepolymer solution thus formed was added to a solution of 4.96 grams of ethylenediamine and 1340 grams of dimethylacetamide. The addition was made slowly with vigorous agitation at 24° to 30° C. Upon completion of the polymerization step the resulting solution had a viscosity of 16,000 cps.

Separately, a polyester-urethane-urea polymer was prepared in the following manner. 400 grams of polytetramethyleneoxide glycol having a molecular weight of 2100 and 70 grams of dimethylacetamide was added to a solution of 94 grams of p,p′-methylene diphenyl diisocyanate. The reaction was maintained at 35° C. for about 80 minutes. After the reaction was completed, the prepolymer solution was diluted to 40 percent solids with the addition of dimethylacetamide in order to improve the miscibility of the prepolymer during the later polymerization. 932 grams of the thus formed prepolymer solution was added to a solution of 8.67 grams of ethylenediamine in 1005 grams of dimethylacetamide. The addition was made slowly with vigorous agitation at 24° to 30° C. Upon completion of the polymerization step the resulting solution had a viscosity of 20,500 cps.

Fibers were wet spun from these polymers separately and in admixture with each other in amounts indicated in the following table.

TABLE

| Polymer composition | Elongation, percent | Tenacity, g./d. | Stress at 150% extension |
|---|---|---|---|
| 100% polyester-urethane-urea | 495 | 0.060 | 0.025 |
| 80% polyester-urethane-urea, 20% polyether-urethane-urea | 552 | 0.77 | 0.032 |
| 65% polyester-urethane-urea, 35% polyether-urethane-urea | 610 | 0.92 | 0.033 |
| 50% polyester-urethane-urea, 50% polyether-urethane-urea | 656 | 1.04 | 0.036 |
| 35% polyester-urethane-urea, 65% polyether-urethane-urea | 604 | 0.81 | 0.036 |
| 100% polyether-urethane-urea | 550 | 0.50 | 0.037 |

As can be seen from the results given in the table, both the elongation and the tenacity of the composite fibers of the present invention are greatly improved over those values in fibers made from either the polyester-urethane-urea polymer alone or the polyether-urethane-urea polymer alone. The stress at 150 percent extension is also greatly improved in the composite fibers over the polyester-urethane-urea polymer alone. While the polyether-urethane-urea polymer alone gave a higher value for the 150 percent stress, the overall balance of properties in this fiber is inferior to those of all of the composite fibers produced.

It will be apparent that many widely different embodiments of this invention may be made without departing from the spirit and scope thereof, and therefore, it is not intended to be limited in any way except as indicated in the appended claims.

We claim:
1. A synthetic, composite, elastic fiber having an essentially linear structure and composed of 35 to 80 weight percent of a segmented polymer having the formula

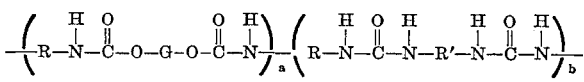

wherein G is a long chain polyester radical having a structure such that the polyester diol of the formula

HO—G—OH has a melting point below about 60° C. and a molecular weight above about 400, R is an aromatic radical containing 6 to 20 carbon atoms,

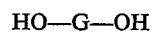

is a diamino radical having a structure such that a diamine of the formula H₂N—R′—NH₂ is a member of the group consisting of hydrazine, alkylene diamine, alkarylene diamines and dihydrazides and a and b are integers greater than 0; and 65 to 20 weight percent of a polymer having the formula

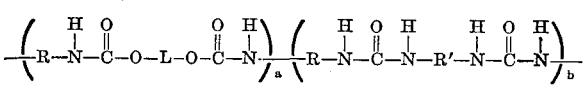

wherein R, R′, a and b are as defined above and L is a long chain polyether radical resulting from the removal of OH groups from a polyether diol of the formula

HO—L—OH having a melting point below about 60° C. and a molecular weight above about 400.

2. The synthetic fiber as defined in claim 1 wherein G is a residue after removal of the terminal OH groups from polycaprolactone.

3. The synthetic fiber as defined in claim 1 wherein L is a residue after the removal of the terminal OH groups from polytetramethylene glycol.

4. The synthetic fiber as defined in claim 1 wherein G represents the residue after the removal of the terminal OH groups from polycaprolactone and L represents the residue after removal of terminal OH groups from polytetramethylene glycol.

5. The synthetic fiber as defined in claim 1 wherein R represents the residue after removal of the terminal isocyanate groups from p,p′-diphenylmethane diisocyanate.

6. A synthetic fiber as defined in claim 1 wherein R′ represents an ethylene radical.

7. A synthetic fiber as defined in claim 1 wherein G represents the residue after the removal of the terminal OH groups from polycaprolactone, L represents the residue after the removal of the terminal OH groups from polytetramethylene glycol, R represents the residue after the removal of the terminal isocyanate groups from p,p′-diphenylmethane diisocyanate and R′ represents an ethylene radical.

8. A process for preparing an elastic fiber which comprises the steps of (a) reacting a polyester diol having a melting point below about 60° C. and a molecular weight above about 400 with an aromatic diisocyanate and a molar ratio of diisocyanate to polyester diol between 1.2:1 and 2.5:1 to form a first isocyanate-terminated prepolymer, (b) reacting said first prepolymer with a diamine in a molar ratio of about 1:1 to form a first polyurethane-urea polymer, (c) separately reacting a polyether diol having a melting point below about 60° C. and a molecular weight above about 400 with an aromatic diisocyanate in a molar ratio of diisocyanate to polyether diol between 1.2:1 and 2.5:1 to form a second isocyanate-terminated prepolymer, (d) reacting said second prepolymer with a diamine in a molar ratio of about 1:1 to form a second polyurethane-urea polymer, (e) admixing said first polyurethane-urea polymer with said second polyurethane-urea polymer in a weight ratio between 35 to 65 and 80 to 20 and thereafter extruding said mixture to form a composite elastic fiber.

9. The process as defined in claim 8 wherein the polyester diol is polycaprolactone.

10. The process as defined in claim 8 wherein the polyether diol is polytetramethylene glycol.

11. The process as defined in claim 8 wherein the aromatic diisocyanate is p,p'-methylene diphenyl diisocyanate.

12. A process as defined in claim 8 wherein the diamine is ethylenediamine.

References Cited

UNITED STATES PATENTS

| | | | |
|---|---|---|---|
| 2,929,804 | 3/1960 | Steuber | 260—77.5 |
| 2,998,403 | 8/1961 | Mullen | 260—858 |
| 3,186,971 | 6/1965 | Hostettler | 260—77.5 |
| 3,097,192 | 7/1963 | Schmit | 260—858 |
| 3,284,539 | 11/1966 | McElroy | 260—858 |
| 3,361,844 | 1/1968 | Hoeschele | 260—858 |

FOREIGN PATENTS 1,359,969   3/1964   France.

PAUL LIEBERMAN, Primary Examiner

U.S. Cl. X.R.

260—75, 77.5, 78.3

UNITED STATES PATENT OFFICE
CERTIFICATE OF CORRECTION

Patent No. 3,542,903   Dated November 24, 1970

Inventor(s) Nicholas R. Congiundi and Lloyd T. Jenkins

It is certified that error appears in the above-identified patent and that said Letters Patent are hereby corrected as shown below:

Col. 2, line 70, after "when" insert ---of---.

Col. 4, line 37, delete "alkyl-" and substitute ---alkarylene--

Col. 4, line 38, cancel "arylene".

Signed and sealed this 6th day of April 1971.

(SEAL)
Attest:

EDWARD M. FLETCHER, JR.
Attesting Officer

WILLIAM E. SCHUYLER, JR.
Commissioner of Patents